United States Patent [19]
Drumright

[11] Patent Number: 4,862,595
[45] Date of Patent: Sep. 5, 1989

[54] EXTENSION LEVEL

[76] Inventor: Ronald R. Drumright, 1156 Chateau Dr., West Plains, Mo. 65775

[21] Appl. No.: 230,350

[22] Filed: Aug. 10, 1988

[51] Int. Cl.[4] .............................................. G01C 9/00
[52] U.S. Cl. ...................................... 33/374; 33/381
[58] Field of Search .................. 33/324, 375, 161, 381

[56] References Cited

U.S. PATENT DOCUMENTS

| | | |
|---|---|---|
| 686,360 | 11/1901 | Smiddy et al. |
| 747,850 | 12/1903 | Bihlmen . |
| 945,275 | 1/1910 | Herstod . |
| 1,403,676 | 1/1922 | Thoennes . |
| 1,413,056 | 4/1922 | Cooley . |
| 1,430,904 | 10/1922 | Hunter . |
| 2,419,451 | 4/1947 | Keller . |
| 2,551,524 | 5/1951 | Bullivant . |
| 2,879,606 | 3/1959 | Oliveie . |
| 3,104,477 | 9/1963 | Edwill . |
| 3,161,964 | 12/1964 | Myles . |
| 3,648,378 | 3/1972 | Thingstad . |
| 3,811,197 | 5/1974 | Moore et al. . |
| 4,130,945 | 12/1978 | Talbot . |
| 4,607,437 | 8/1986 | McSorley . |

Primary Examiner—Harry N. Haroian
Attorney, Agent, or Firm—Harvey A. Gilbert

[57] ABSTRACT

A standard three foot carpenter's level with two sleeve-like extensions adjustably movable upon it to provide accurate plumbing and trueing facilities to six foot-six inch and eight foot lengths. The top and bottom surfaces of the base level have projections which fit into top and bottom interior surface slots in the extensions to prevent transverse motion between the base level and extensions while minimizing surface contact and wear between the two. A centered slot in each of the two opposing side walls of each extension limit the contact with and wear between those walls and the mating flat side walls of the base level. The front face of the base level contains a pair of depress buttons to engage apertures in each extension to set the 6'6" or 8' length. The base level contains three bubble vials, one at the midpoint and the other two equal distant from and on opposite sides of the mid-point vial. The extensions have a pair of semi-circular openings which meet about the mid-point vial, or partially encircle the other two vials in the base level corresponding to the 6'6" or 8' extension modes. Each extension has a spacer block movably secured to a slot in its bottom surface to permit the extension level to avoid most irregularities in the surfaces of construction materials being plumbed or trued.

17 Claims, 2 Drawing Sheets

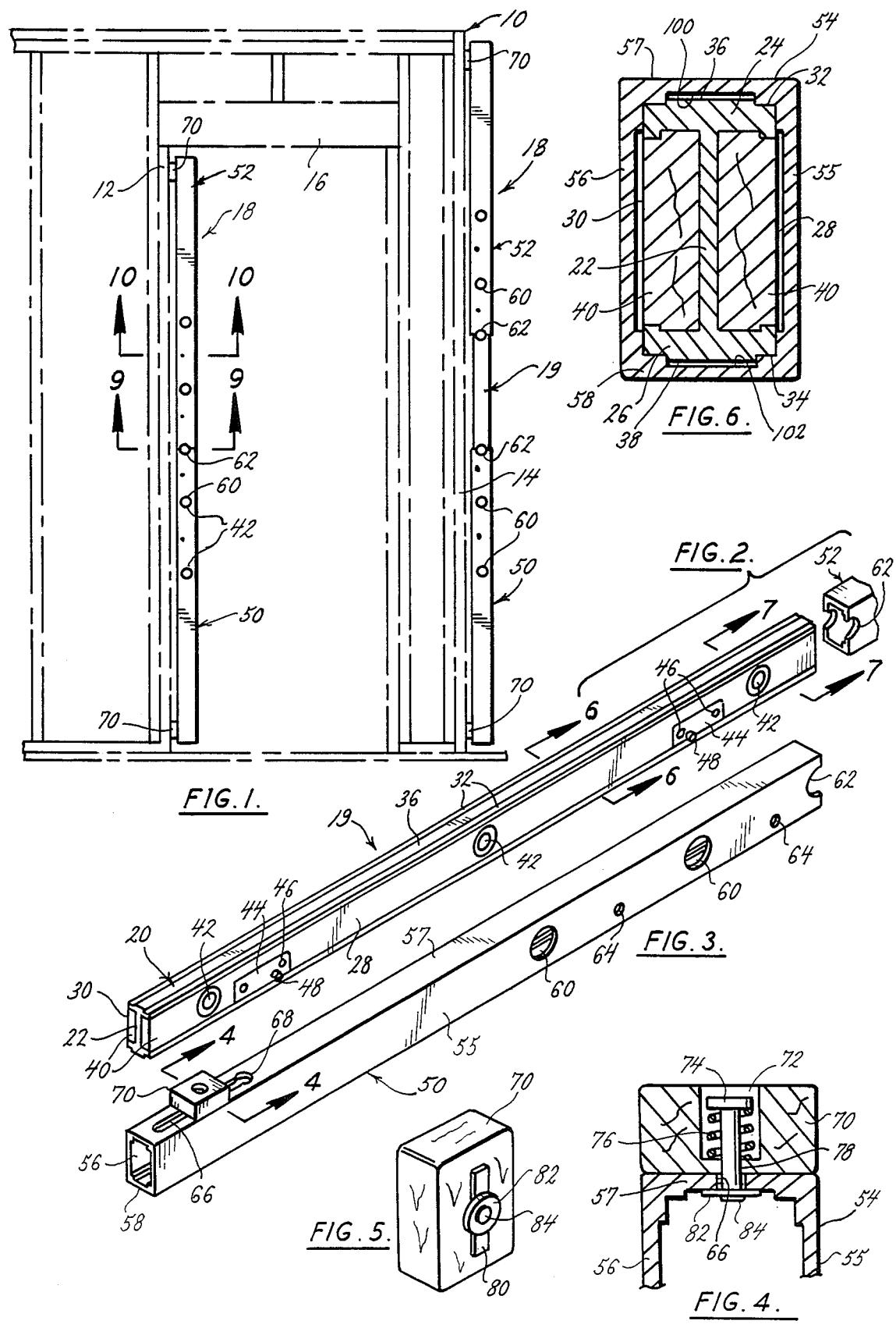

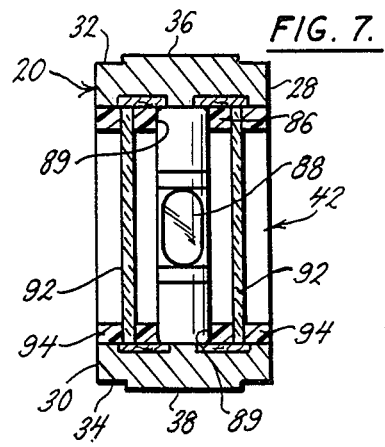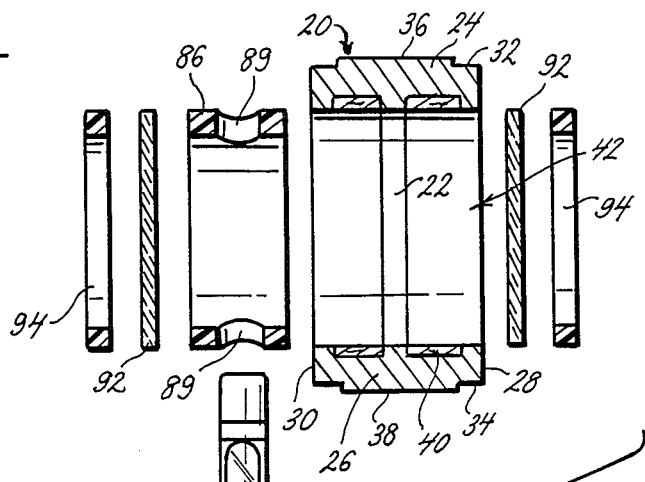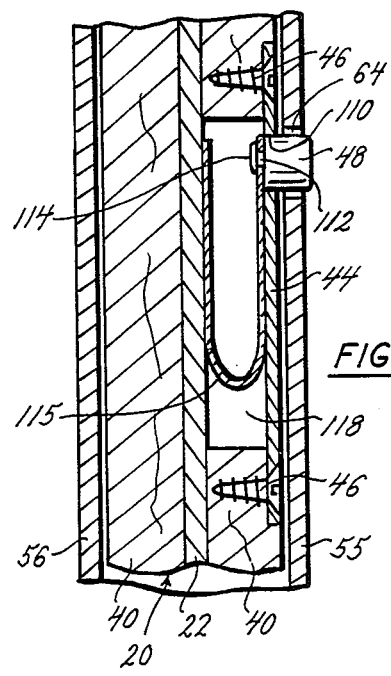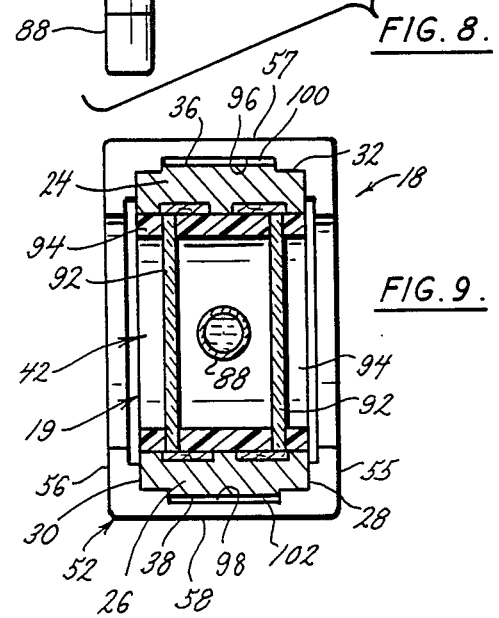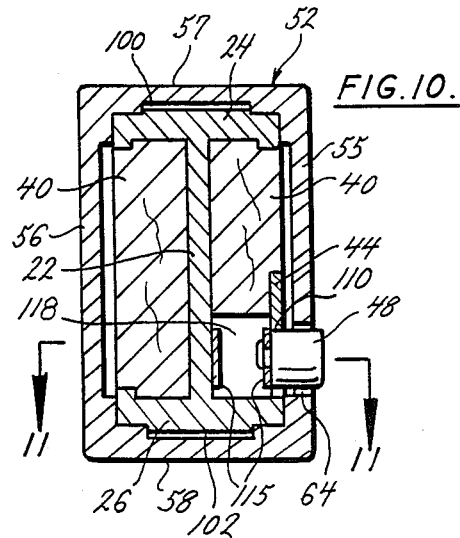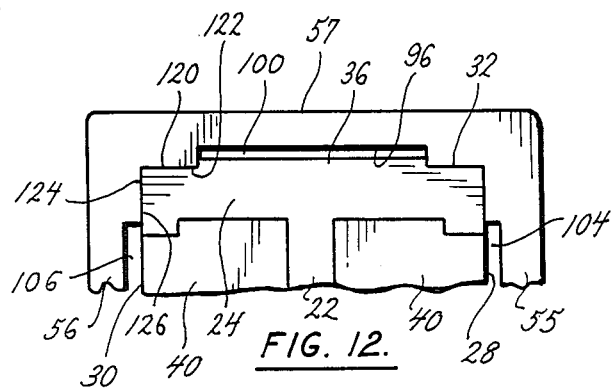

EXTENSION LEVEL

BACKGROUND OF THE INVENTION

The present invention relates to a carpenter's level and in particular to a carpenter's level that may be extended.

It is well known in the art that there have been a wide variety of levels offering extension capabilities. Starting from the typical situation that one frequently sees in the field, the carpenter may obtain several straight studs and assemble an extension level at the site. Once all of the appropriate elements of an extension level have been assembled for the initial application, the user will of course attempt to keep all of the pieces together, store them, and maintain them for future use. This presents some difficulty in view of the fact that the sizes of the various pieces may be quite large, the pieces are generally separate, and not fabricated as a system so that some of the pieces may become lost if not carefully stored, and because of the specific and custom nature of the original assembly for the particular application the pieces may not be easily rearranged when reassembled to immediately satisfy the new application. Likewise with the multitude of extension levels that are known in the art some of these same problems have existed. Thus, the sizes of some of the extension levels are not large enough to address the types of applications that the present invention addresses and the sizes of the elements of some of the extension levels known in the art are such that they are inconvenient to carry and store. This latter issue is specifically of concern when one realizes that frequently these devices are carried in the trunk of a car, or utility tool boxes in pickup trucks which will not accommodate lengths over five and one half feet.

A number of examples of extension levels to which reference may be made for information relating to applications and solutions considered in the past are reflected in the following patents which the applicant hereby incorporates by reference herein: 4,607,437; 4,130,943; 3,811,197; 3,648,378; 3,104,477; 3,161,964; 2,879,606; 2,419,451; 1,430,904; 1,413,056; 1,403,676; 945,275; 747,850; 686,360. These patents address a variety of applications that various people have considered, and they show the spectrum of devices that have been created to address some of the solutions either in whole or in part. One can see that in this spectrum there are some extension levels that are more complicated than others, and that a number of these levels are somewhat complicated to fabricate and manufacture. The issue of wear and performance variations due to wear do not appear to have been addressed. Thus, in addition to the size of the extension levels that have been devised, the reliability in providing the desired plumbing and trueing capabilities for an extension level to be used in a particular application, and the producibility and cost of manufacturing many of these devices has varied considerably.

It is thus an object of the present invention to provide an accurate means for checking plumb and level over a range from the length of a standard three foot level to lengths for setting standard door jambs and plumbing walls, respectively. Thus, it is intended to provide a device that can be varied from the standard three foot length to at least the additional lengths of six foot six inches for door jambs, and eight foot for plumbing walls.

It is another object of the present invention to provide an extension level with the structural rigidity demanded for maintaining accuracy over the entire adjustment range and over an extended period of use and life expectancy.

It is yet another object of the present invention to provide a rigid means of holding the plumb and level bubble vials within the extension level structure.

It is another object of the present invention to provide for slidable adjustment for an extension level with a minimum of structural resistance and wear.

Another object of the present invention is to provide an extension level functionally capable of spanning warped surfaces between its extremities.

Yet another object of the present invention is to provide an extension level adaptable for applications involving metal studs and construction members as well as wood and other construction material.

Still another object of the present invention is to provide an extension level that is easily collapsable for storage, handling, and transport.

Finally, it is an object of the present invention to provide a positive locking of the extension elements of an extension level to the base level at preselected or custom lengths.

The present invention addresses all of the above demands for an acceptable extension level by means of three basic structural members, specifically including a base level of the standard three foot size which contains the bubble vials within apertures or viewing ports, and two sleeve-like extension which slide over and are held securely to the base level at points appropriate to provide an overall extension level capable of handling the six foot six inch application demands and the eight foot requirements for such a level. Applications requiring level lengths other than six feet six inch and eight feet can be addressed by drilling a seven-sixteenth inch diameter hole in each extension in line with and spaced from the depress button holes already in existence. All of the functional elements required to permit these three major structural elements to perform their job are part of these elements with the exception of two spacer blocks which are slidably secured to the extremities of the two extension sleeves which slide upon the base level. The spacer blocks are only secured to the extensions when needed for applications where spanning irregular surface features of the structural member being checked is a requirement.

SUMMARY OF THE INVENTION

The present invention addresses all of the problems and concerns recited above and offers a very simple, reliable, producible, and inexpensive solution. The extension level of the present invention consists of a base level which is essentially a standard three foot length combined with two opposed, rectangular cross section tubular sleeves which slide upon the opposite ends of the base level. The base level itself has three apertures containing bubble vials which are affixed within the apertures in such a way that they are reliably held in place. Thus, the usual adhesive or other type of bonding or attachment for vials is not used in the present application. In addition to the bubble vials in the apertures of the base level the top and bottom surfaces of the base level have centrally located projections which engage slots centrally located in the top and bottom interior surfaces of the extensions to prevent lateral movement between the two when the extensions are being used. The projections on the top and bottom surfaces of the base level extend only partially down into the slots of the extensions so that the amount of top and bottom surface contact between the base level and the interior upper and bottom surfaces of the extensions is minimized. This helps to eliminate sliding friction and more importantly wear between the elements which can and typically do have an adverse effect on performance over a period of time. In a somewhat similar vein the front and rear interior surfaces of the extensions contain centrally located slots which eliminate some of the surface contact with the uniform front and rear surfaces of the base level. The base level also contains two depress buttons on its front face towards its bottom, each spaced equally distant from the mid-point of the base level to engage one of two corresponding holes located on each of the extensions for the purpose of locking the extension relative to the base level for each of the lengths of interest, specifically the six foot six inch length and the eight foot length. As noted above, other lengths may be accommodated by custom drilling holes at appropriate locations on each of the extensions. Each of the extensions contain a pair of circular viewing apertures located between its two ends, and a half or semicircular pair of apertures on the end of the extension that would be located at the mid point of the base level when the extension is slid upon the base level. These pairs of apertures in the front and rear surfaces of the extensions correspond with the bubble vial viewing ports in the base level for each of the extension modes. In addition, the holes which engage the depress buttons are located towards the bottom of the front face of the extensions between the pair of semicircular apertures and the first circular aperture pair, and another between the first pair and second pair of aperture in the extension. An elongated slot having an enlarged circular opening at the inboard one of its two closed ends is located on the top surface at the extreme end of each of the extensions away from the base level for the purpose of receiving and slidably securing a spring loaded movable spacer block. The spacer block contains a spring biased fastener which permits it to slidably engage itself to the slot. The spacer blocks are the means by which the extension is used over irregular surfaces during applications requiring the use of the extensions. For storage purposes after use, the two spacer blocks are removed from the slots on the extension and the two extensions are removed from the base level and the five pieces comprising the present invention are then stored in a carrying container, the overall length of which is forty one inches.

BRIEF DESCRIPTION OF THE DRAWINGS

The above described features of the present invention and the advantages that they provide will be more clearly understood with reference to the following disclosure and the accompanying drawings, wherein:

FIG. 1 is a front pictorial showing the present invention being used for plumbing a door frame assembly and for checking the plumb of an eight foot stud.

FIG. 2 is a perspective of the base level with a portion of the right hand extension being shown adjacent to the right hand portion of the base level.

FIG. 3 is a perspective of the left hand extension of the present invention showing a spacer block installed.

FIG. 4 is a sectional view of a portion of the top of an extension with the spacer block secured by means of the spring loaded fastener.

FIG. 5 is a perspective view of the spacer block assembly.

FIG. 6 is a sectional view of the base level and an extension upon it as seen by taking a sectional view along line 6—6 in FIG. 2.

FIG. 7 is a sectional view taken along line 7—7 in FIG. 2 through a bubble vial viewing port containing a vertically disposed bubble vial.

FIG. 8 is an exploded view of FIG. 7 showing the various elements of the bubble vial retainer assembly.

FIG. 9 similar to FIG. 7, is a sectional view taken through the center vial viewing port containing the horizontal bubble vial.

FIG. 10 is a sectional taken along line 9—9 in FIG. 1.

FIG. 11 is a sectional view through the combined base level and surrounding extension taken along line 10—10 in FIG. 1.

FIG. 12 is a partial sectional view taken along line 11—11 in FIG. 10 to show the depress button spring biasing and retention mechanism of the present invention.

DESCRIPTION OF THE PERFERRED EMBODIMENT

Referring now to FIG. 1 the present invention, extension level 18 is shown being used in door framing 10 to determine the plumb condition of the door stud 12 adjacent to plate 16. Also shown is the extension level 18 in its fully extended mode being used to check the plumb condition of a wall stud 14. In FIG. 2 extension level 18 is shown consisting of the base level 19 which has the I-beam core 20 which has a vertical member 22, a top horizontal member 24 and a bottom horizontal member 26 connected normal to the vertical member 22. The extension level 18 is shown with the front face 28, and the parallel rear face 30. The details of the top and bottom surfaces of the extension level 18 are shown more clearly with reference to FIG. 6. There it is easily seen that there is a top horizontal surface 32 and an opposite and parallel bottom horizontal surface 34. The centered top projection 36 extends normal from the top horizontal surface 32 and the centered bottom projection 38 extends normal from the bottom horizontal surface 34. The significance of these two projections will be discussed further as the disclosure of the present invention continues herein. Refering now back to FIG. 1, it should be noted that there is a wood inlay 40 on each side of the I-beam 20 running the full length of the base level 19. These two inlays are used for the purpose of accommodating the installation of the depress button 48 with the mounting plate 44 and its associated mounting screws 46 to the base level 19. They also contribute to the mounting of the bubble vials 88 within the level apertures 42. Also shown in FIG. 2 is a portion of the second extension 52 with the half apertures 62 on its end facing inward as it is slid upon the base level 19.

The first extension 52 is shown in FIG. 3 which provides considerably more detail with regard to the structure and function of the extensions. With reference to FIGS. 2 and 3 it should be obvious that the first extension 50 slides upon the base level 19 from the left as shown in the FIGS. and the second extension 52 slides upon the base level 19 from the right. When the first extension 50 and second extension 52 meet at the center point of the base level 19, the half apertures 62 come together about the central aperture 42 in the base level 19. Since the second extension 52 is a mirror image of the first extension 50, a discussion of the details of the first extension 50 will suffice to cover both extensions. Thus, first extension 50 is shown with the front wall 55 which is opposite and parallel to a rear wall 56 and additionally has a top wall 57 normal to the front and rear walls and parallel to and opposite a bottom wall 58. In each extension there are two pairs of apertures 60, one of each pair in the front wall 55 and the mating aperture in the rear wall 56 are shown as part of the first extension 50. In addition a pair of half apertures 62 are located at the right end of the first extension 50 which is the end first introduced for sliding upon the base level 19. The two sets of apertures 60 and the set of half apertures 62 of the first extension 50 correspond with the apertures 42 which contain the bubble vials 88 when the extensions 50 and 52 are slid upon the base level 19 and set in the position along the base level 19 which will be used to provide the extended range of the overall extension level 18. Between the half aperture 62 and the first full aperture 60 on the front wall 55 of the first extension 50, a lock hole 64 is located and similarly between the first full aperture and the second full aperture 60, another lock hole 64 is shown. The two lock holes 64 are used to accommodate the depress button 48 on the base level 19 when the first extension 50 and second extension 52 are slid upon the base level 19, in order to fix the position of the extensions for the six foot six inch range of operation and the eight foot range of operation respectively. A slot 66 near the left end of the first extension 50 on its top wall 57 and similarly on the far right end of second extension 52 is shown with an enlarged circular opening 68 at one end to accommodate a spacer block 70. The details of construction of the spacer block 70 and its relationship to the extension 54 is shown in detail in FIG. 4. There it can be seen that spacer block 70 has a cavity 72 within which the fastener 74 is located. The fastener 74 passes through the spring 76 on its way through the opening 78 which is of a smaller diameter then the diameter of the cavity 72 above. The fastener 74 then passes through the flat rectangular shaped land 80 on the bottom of the spacer block 70 which is shown in more detail in FIG. 5 and then is secured with a washer 82 and the flared head 84. This arrangement results in the spring 76 being held within the cavity 72 so that when the fastener 74 is pressed in by means of finger applied force the spring 76 is compressed within the cavity 72 as the fastener moves away from the land 80 so that it can engage the opening 68 and the slot 66 with which it is associated. Thus installed, the spacer block 70 is able to be moved slidably longitudinally along both the first extension 50 and the second extension 52 so that with reference back to FIG. 1 it can be seen that the extension level with the spacer block is able to be used at a slight distance away from an irregular surface which is being checked for overall plumb condition.

In FIG. 6 additional detail of the construction of the base level 19 and the extension 54 is shown. Thus, in cross section the I-beam 20 is shown having vertical member 22 joining top horizontal member 24 and bottom horizontal member 26. Between the top horizontal member 24 and the bottom horizontal member 26 on both sides of the vertical member 22 the wood inlays 40 are shown flush with the ends of the top and bottom horizontal members.

Of particular significance, of course, is the fact that there is a centered top projection 36 extending upward from the top horizontal surface 32 of the top horizontal member 24 and a centered bottom projection 38 extending downwards from the bottom horizontal surface member 34 of the bottom horizontal member 26. It is obvious from FIG. 6 that the top projection 36 and the bottom projection 38 do not extend completely within the top slot 100 or the bottom slot 102 respectively. Thus, as seen in FIG. 9 and more particularly in FIG. 12 the top projection 36 and the interior top wall 96 of the extension 54 and the contact surface between the bottom projection 38 and the interior bottom wall 98 of the extension 54 have limited surface contact. In FIG. 12 it can be seen that the actual points of surface contact between the base level 19 and the extension 54 is limited to the top horizontal contact surface 120 in slidable contact with the top horizontal contact surface 122 and a similar relationship between the surfaces of the bottom horizontal member 26 at the bottom of the base level 19. The vertical surface contacts between the base level 19 and the extension 54 are limited to the top vertical contact surface 124 of the extension 54 and the top vertical contact surface 126 of the top horizontal member 24 and the like surfaces on the opposite side of the top horizontal member 24 plus those on opposite sides of the bottom horizontal member 26. Additionally, as can be seen in FIG. 12, the interior surface of the front wall 55 of the extension 54 has a slot 104 and the rear wall 56 has a centered slot 106 to minimize the amount of surface contact between the interior surfaces of those walls of the extension 54 and the front face 28 and rear face 30 of the base level 19 for its entire length.

In FIGS. 7 and 8 the assembly of the vertical bubble vials within the base level 19 is shown. The vial 88 containing the bubble sight 90 is shown located centrally within the vial mounting holes 89 of the cylindrical vial retainer 86. This mounting scheme assures the secure containment of the vial in position within the apertures 42 of the base level 19. The cylindrical vial retainer 86 containing the vial 88 is centrally positioned in the aperture 42 between the front face 28 and the rear face 30 of the base level 19. Glass disks 92 are placed on both sides of the cylindrical vial retainer 86 and these are held in place within the apertures 42 by the outer cylindrical containers 94 all of which are bonded in place within the aperture 42. An appropriate cement such as epoxy resin glue is used to effect the bonds. Properly assembled, the outer retainer 94 is flush with the top vertical contact surface 126 on both sides of the I-beam 20 and the similar surfaces at the bottom of the I-beam. FIG. 9 shows the horizontally disposed bubble vial which is assembled in the same manner as is the vertical bubble vial disclosed in FIG. 7.

With reference now to FIGS. 10 and 11 the assembly of the depress button 48 is shown. The depress button 48 extends through the opening 110 in the mounting plate 44. The depress button 48 is secured within the opening 110 by means of a neck 112 which extends through a U-spring 115 and held in place by a flared head 114 connected to the neck 112. The U-spring 115 is disposed within the retainer slot 118 within the wood inlay 40. The entire depress button 48 assembly including the U-spring 115 which holds the depress button 48 within the retainer slot 118 and at the same time provides the spring bias which permits it to engage the lock hole 64 in the front wall 55 of the extension 54 by means of the mounting plate 44 overlying the retainer slot 118 and held in place by means of the wood screws 46 inserted into the wood inlay 40. Thus, when the first extension 50 and the second extension 52 are slid over the opposite ends of the base level 19 until the respective depress buttons 48 engage the first or second lock hole 64 in each extension, the extension level 18 is set for use in either the six foot six inch application mode or the eight foot mode. When the depress button 48 engages the first lock hole 64 from the end of each extension 54 with the half aperture 62 the extension level 18 is prepared for use in the eight foot application case. On the other hand when the second lock hole 64 from the half aperture 62 end of the extension 54 is engaged by the depress button 48 on the base level 19 the extension level 18 is prepared for use in the eight foot overall length. Other intermediate lengths may be created by drilling the same seven sixteenths inch diameter size holes in appropriate locations along each extension 54 in line, longitudinally, with the pre-existing six foot six inch and eight foot lock holes 64 on each extension. When the application requires that the extension level 18 be used over irregular surfaces, the spacer blocks 70 are inserted into the slot 66 near the ends of each of the extensions 50 or 52. The I-beam 20 of the present invention is made of an aluminum material. The wood inlay 40 is fabricated from walnut wood. The cylindrical vial container 86 and the outer cylindrical retainers 94 are fabricated from one and five eights inch diameter rigid plastic tube. The vial 88 are commercially available from tool supply houses. The first and second extensions 50 and 52 respectively are fabricated from rectangular cross section aluminum tubing of a type designated as 6063. The length of the slot 66 is five inches and the diameter of the opening 68 at the end of each slot is five eights inch. The fastener 74 and the spring 76 are available from hardware supply houses commonly known to those skilled in the art. The spacer block 70 is fabricated from the same type of walnut wood as used in the wood inlay 40. The cavity 72 diameter and the opening 78 below the cavity 72 in the spacer block 70 are sized to accommodate spring 76 and the fastener 74. The U-spring 115 is fabrciated from sheet spring material. The diameter of the lock holes 64 are seven sixteenths inches. The aperture 60 diameters are one and one-half inches.

As will be understood by those skilled in the art the selection of materials, the configuration of the present invention, and the dimensions provided may be varied without exceeding the scope of the present invention as claimed herein. Thus, selection of the wood for the wood inlay can be varied somewhat and the selection of the metal elements of the invention including the base level I-beam and the extensions can be varied as long as the metals from which these elements are made is hard enough to withstand continuous wear and to hold the dimensional tolerances that will permit sliding action of the extensions upon the base level without incurring any undue wear between the metal elements or incurring any adverse transverse movement between the base level and the extensions riding upon it.

What I now claim as my invention is:

1. An extension level incrementally adjustable in length, comprising,
    (a) an elongated base level having a front face parallel to and coextensive with an opposite rear face and opposed and parallel top and bottom surfaces, normal to said front and rear faces, along the length of its longitudinal axis,
    (b) a centrally located aperture and at least two additional apertures located equal distance from and on opposite sides of said centrally located aperture, said apertures extending from said front face through said base level to said rear face, the centrally located aperture containing a bubble vial disposed lengthwise in the direction of the longitudinal axis of said base level, the two additional apertures each containing a bubble vial disposed normal to said longitudinal axis, said base level further having first and second, spring-backed depress buttons protruding from and normal to said front face, and each located an equal distance from and on opposite sides of the mid-point of said longitudinal axis,
    (c) sleeve-shaped first and second extensions slidably mounted upon the opposite ends of said base level such that the longitudinal axis of said extensions lies in the same plane as and is coextensive with the longitudinal axis of said base level, said extensions having a front and rear face and a top and bottom face, said front face of each having at least one opening sized to accommodate a corresponding depress button on the front face of said base level, said extensions additionally having a plurality of paired apertures in their front and rear faces, and a half-aperture on both of said faces on the ends of each extension which meet at the midpoint of said base level at which point the combination of said half apertures encompass said central aperture of said base level containing said horizontal bubble vial, the outer most pairs of apertures on each extension corresponding with the outer aperture pairs of said base level, which contain a vertical bubble vial, when said extensions are in their first extended positions, and when they are at the second, and maximum extension position, the inner most pairs of apertures of said extensions correspond with the outer aperture pairs of said base level, said extensions each having an elongated slot longitudinally located upon the bottom face on the end opposite said half-aperture, said slot opening into a circular aperture, and
    (d) a pair of spacer blocks, each having a central opening sized to accept a bolt head and extending from one of two opposed faces through said block to an intermediate point extending from the other of said opposed faces and then a flat land secured thereto, said land sized to slidably reside in said slot, said lesser diameter opening sized to accommodate the shaft of said bolt, said bolt extending through a spring residing and retained in the larger diameter central opening, said spring retained therein by the overlapping head of said bolt, the shaft of said bolt further extends through the smaller diameter opening and through said land, the threaded end of said bolt extending past said land secured by a washer and nut combination locked in position near the end of said threaded bolt, one of said spacer blocks adjustably attached to the bottom of each extension by depressing said bolt head against said spring causing said washer and nut combination to move away from said land so that said washer and nut combination can be introduced into the circular aperture at the end of said slot on the bottom of said extension end, said land acting as a key residing in said slot holding said block from transverse movement, said block compressively pressing against the outside face of said extension when pressure on said bolt head is released permitting said spring to expand against said bolt head and press said washer and nut combination against the inside surface of said extension along said slot to restrict longitudinal movement of said block along said slot.

2. The extension level of claim 1 wherein said base level, comprises; an I-beam shaped core having wood inlays for the length of said core between the vertical member of said I and the over hanging portions of the top and bottom horizontal members of the I-shaped core on both sides of said vertical member.

3. The extension level of claim 2 wherein said extensions are rectangular in cross-section.

4. The extension level of claim 3 wherein each of said sleeve-shaped extensions has a centered, rectangular cross-section slot in its interior top and bottom walls, and in its two side walls, said slots extending the entire length of each extension.

5. The extension level of claim 4 wherein said I-beam has opposing and centered projections extending the entire length of said beam from and normal to its top and bottom surfaces, said projections being of less height then the depth of said interior top and bottom wall slots in said extensions, in which slots said projections extend, the top vertical contact surfaces of each of said projections in slidable contact with the top vertical wall on each side of said slot.

6. The extension level of claim 5 wherein said depress buttons are each disposed in an opening in a mounting plate overlaying a retainer slot in and secured to one face of said extension level, said depress buttons being secured movably within said openings for in and out excursions, by means of a spring-like retainer residing in each of said retainer slots and biasing said depress buttons in a normally extended condition through said openings and above said mounting plate and the face of said extension level through which it acts.

7. The extension level of claim 6 wherein said spring-like retainer is a U-shaped flat metal spring, to one flat extremity of which said depress button is secured.

8. The extension level of claim 7 wherein said mounting plate is secured to said face of said extension level by a fastening means compatible with said wood inlay and capable of holding said plate secure against the force applied by said underlying spring-like retainer.

9. The extension level of claim 8 wherein said fastening means is a plurality of counter-sunk wood screws.

10. The extension level of claim 9 wherein said bubble vial containing apertures are cylindrical.

11. The extension level of claim 10 wherein said means for holding bubble vials in said aperture, comprises:
 (a) a cylindrically-shaped retainer having diagonally opposed holes at its midsection between its two open ends, sized to provide a snug fit for the bubble vial disposed therein, said retainer itself sized for snug insertion in and having an end to end length less than the thickness of said base level, and immovably affixed centrally within said apertures.
 (b) a pair of opposed glass disks, one each of which is disposed on opposite sides of and in contact with the peripheral surface on each end of said cylindrical retainer, and,
 (c) a pair of cylindrical, washer shaped outer retainer rings, one each of which is disposed against each of said glass disks, snugly inserted and immovably affixed within said aperture flush with the surface of said wood inlay.

12. The extension level of claim 11 wherein said spacer block has at least the surface parallel to the surface in contact with said extension fabricated from a material which is magnetic.

13. An extension level incrementally adjustable in length, comprising:
 (a) an elongated base level having a front face parallel to and coextensive with an opposite rear face and an opposed and parallel top and bottom surface, each normal to said front and rear faces, along the length of its longitudinal axis,
 (b) a centrally located aperture and at least two additional apertures located equally distant from and on opposite sides of said centrally located aperture, said apertures extending from said front face through said base level to said rear face, said centrally located aperture containing a bubble vial disposed lengthwise in the direction of and in parallel with said longitudinal axis of said base level, said two additional apertures each containing a bubble vial disposed normal to said longitudinal axis,
 (c) sleeve-shaped first and second extensions for slidable mounting upon the opposite ends of said base level such that the longitudinal axis of each of said extensions lies in the same plane as and is coextensive with the longitudinal axis of said base level, said extensions having a front and rear wall and a top and bottom wall, said extensions additionally having a plurality of paired apertures in their front and rear walls, and a half-aperture on both of said walls on the ends of each extension which meet at the midpoint of said base level at which point the combination of said half-apertures encompass said central aperture of said base level containing said horizontal bubble vial, the outermost pairs of apertures on each extension corresponding with the outer aperture pairs of said base level, which contain a bubble vial, when said extensions are in the first extended positions, and when they are at the second, and maximum extended position, the innermost pairs of apertures of said extensions correspond with the outer aperture pairs of said base level, said extensions each having an elongated slot longitudinally located upon the bottom wall on the end opposite said half-apertures, said slot opening into a circular aperture,
 (d) means disposed on the top and bottom faces of said base level for holding said extensions from transverse movement relative to said base level while permitting snug longitudinal movement between said base level and said extensions,
 (e) a means secured to, near each end of, and movable above and below at least one of said front or rear faces of said base level for locking each of said extensions to said base level to prevent relative longitudinal movement there between,
 (f) means on said extensions for engaging said locking means on said base level, and
 (g) a slidably adjustable means for spacing said base level from a surface, said means disposed on and projecting normal to said bottom wall of said base level.

14. An extension level incrementally adjustable in length, as recited in claim 13, further comprising: means disposed in said interior top and bottom walls of said extensions for their entire length, for engaging said means for holding said extensions to prevent transverse movement relative to said base level.

15. An extension level incrementally adjustable in length, as recited in claim 14, wherein said means disposed on said top and bottom surfaces of said base level and said means in said top and bottom interior walls of said extensions are sized and disposed to provide minimum surface contact and virtually total elimination of transverse movement of said extensions relative to said base level.

16. An extension level incrementally adjustable in length, as recited in claim 15, wherein said means disposed on the top and bottom surfaces of said base level is a pair of opposed projections extending upwards from two back to back steps upon said top and bottom surfaces of said base level.

17. An extension level incrementally adjustable in length, a recited in claim 16, wherein said means disposed in said interior top and bottom walls of said extensions for their length, for engaging said means for holding said extensions to prevent transverse movement relative to said base level is a pair of opposed slots in said top and bottom walls sized for greater depth than the amount of extension of said projections into said slots.

* * * * *